United States Patent
Regis et al.

(10) Patent No.: US 8,132,757 B2
(45) Date of Patent: Mar. 13, 2012

(54) PITCH-OSCILLATION LIMITATION SYSTEM APPLIED TO AN AIRCRAFT

(75) Inventors: Olivier Regis, Toulouse (FR); Gregory Sicault, Fonsorbes (FR); Emmanuel Kopp, Toulouse (FR)

(73) Assignee: Airbus France, Toulouse (FR)

( * ) Notice: Subject to any disclaimer, the term of this patent is extended or adjusted under 35 U.S.C. 154(b) by 840 days.

(21) Appl. No.: 12/168,988

(22) Filed: Jul. 8, 2008

(65) Prior Publication Data
US 2009/0065635 A1     Mar. 12, 2009

(30) Foreign Application Priority Data

Sep. 7, 2007  (FR) ..................................... 07 56358

(51) Int. Cl.
*B64F 1/02*     (2006.01)
(52) U.S. Cl. ..................... 244/110 A; 244/111; 303/126
(58) Field of Classification Search .................. 244/111, 244/110 A, 50, 51; 188/1.11 E, 1.11 L; 303/126
See application file for complete search history.

(56) References Cited

U.S. PATENT DOCUMENTS

| | | | | |
|---|---|---|---|---|
| 3,027,123 A | * | 3/1962 | Westcott, Jr. ................. | 244/111 |
| 3,669,508 A | * | 6/1972 | Attri ............................. | 303/168 |
| 4,007,970 A | * | 2/1977 | Romero ........................ | 303/126 |
| 4,646,242 A | * | 2/1987 | Valaas ............................ | 701/70 |
| 6,030,056 A | * | 2/2000 | Sawada et al. ............. | 303/113.5 |
| 6,220,676 B1 | * | 4/2001 | Rudd, III ..................... | 303/150 |
| 2005/0231030 A1 | * | 10/2005 | Frank ............................ | 303/126 |

FOREIGN PATENT DOCUMENTS

| | | |
|---|---|---|
| EP | 0823360 A | 2/1998 |
| EP | 1588912 A | 10/2005 |
| FR | 2877312 A | 5/2006 |

OTHER PUBLICATIONS

International Search Report dated Feb. 8, 2008.

* cited by examiner

*Primary Examiner* — Tien Dinh
*Assistant Examiner* — Philip J Bonzell
(74) *Attorney, Agent, or Firm* — Perman & Green, LLP

(57) ABSTRACT

A pitch-oscillation limitation system, applied to an aircraft having main landing gear located toward the center of the aircraft and forward landing gear located under the nose of the aircraft, wherein the system includes means for automatically applying, in the event of sudden braking, time-deferred braking between the wheels of the landing gear under the wings and the wheels of the landing gear under the fuselage, so as to reduce the amplitude of the aircraft's pitching motion.

9 Claims, 3 Drawing Sheets

PITCH-OSCILLATION LIMITATION SYSTEM APPLIED TO AN AIRCRAFT

BACKGROUND

1. Field

The disclosed embodiments relate to a system whose purpose is to limit the vertical load applied to the forward landing gear of aircraft, as well as the oscillations of the said aircraft when braking is performed on the ground, including, in particular, low-speed emergency braking.

The disclosed embodiments are applicable to the field of aeronautics, and, more specifically, is intended for heavy aircraft equipped with a set of forward landing gear.

2. Brief Description of Related Developments

Generally speaking, an aircraft is equipped with multiple sets of landing gear, whose essential functions consist primarily of allowing the aircraft to maneuver on the ground, which functions include taxiing, turning, and braking, and, secondarily, of absorbing the vertical kinetic energy of the aircraft upon landing. Each landing gear includes one or more wheels, and is equipped with a shock absorber that ensures comfort during taxiing and dampens the impact upon landing.

Modern heavy aircraft include two separate types of landing gear: the main gear, on the one hand, which are affixed under the wing and/or under the fuselage, and the forward landing gear (which in rare cases may consist of two juxtaposed sets of forward landing gear), which are affixed under the fuselage forward of the main landing gear. Because the aircraft needs at least three points of support on the ground in order to be stable, the most simple configuration (known as the "tricycle" configuration) consists of two sets of main landing gear (left and right) mounted symmetrically under the wings or the fuselage, and one set of forward landing gear.

The purpose of the main landing gear is to withstand the majority of the loads transmitted between the ground and the aircraft, during taxiing and also during landing. The main landing gear also provide the braking function, with each of their wheels (or sometimes only a portion of the wheels) being equipped with a brake.

Meanwhile, the forward landing gear, whose primary role is to provide the additional point of support that is essential to the stability of the aircraft on the ground, absorbs much less of the load than the main landing gear. Generally speaking, its principal function is to steer the aircraft on the ground; for this purpose, the wheel or wheels of the forward landing gear are steerable.

Thanks to the configuration of modern aircraft, as described hereinabove, the forward landing gear is subjected to much weaker loads than the main landing gear for the majority of the maneuvers on the ground, including low-speed or moderate-speed taxiing, turns, and landing.

However, this is not the case when the aircraft performs violent braking. As a result of the effect of the sudden and continuous application of a braking effort on the main landing gear, the aircraft performs a rapid diving motion around its pitch axis, which motion compresses the shock absorber of the forward landing gear and applies a high vertical load to this landing gear, along with major loads on a structure of the aircraft (for example, a sharp load and a flexing moment of the forward fuselage).

Furthermore, when the compression of the shock absorber of the forward landing gear has reached its maximum point, the pressure applied to the shock absorber is relieved, and the shock absorber returns part of the energy that was stored during the compression phase. Because the braking load on the main landing gear continues to be applied during this period, the resulting diving effect halts the release of energy by the forward landing here, and initiates another compression phase. The phenomenon is repeated, such that a series of compressions and releases of the forward landing gear occurs, which is reflected in a pitch oscillation by the aircraft (at the same frequency of the aircraft resting on its landing gear, i.e., on the order of 1 Hz for the heaviest aircraft), with the loads on the forward landing gear and in the structure of the aircraft oscillating at the same frequency. Is oscillations may persist for a fairly long time, because the damping force and the internal friction of the shock absorber of the forward landing gear are usually too weak to dampen these oscillations rapidly.

The phenomena described hereinabove have the following disadvantages:

First of all, the maximum loads and stresses applied to the forward landing gear into the structure may be substantial and damaging in terms of the structural mass of the aircraft;

Secondly, the oscillations of the loads and of the stresses at high levels are capable of causing substantial fatigue of the structure and the forward landing gear, as well as internal wear on the landing gear due to the effect of the friction; and Last, the pitch oscillations can cause discomfort among the crew and passengers.

SUMMARY

The aspect of the disclosed embodiments are to provide a system that is simple in its design and in its implementation and that makes it possible to achieve a significant limitation of the amplitude of the oscillations and to reduce the maximum loads and stresses, thereby attenuating or eliminating the disadvantages listed immediately hereinabove.

The disclosed embodiments relate to a pitch-oscillation limitation system, and is applied to an aircraft equipped with a forward landing gear and with at least two sets of main landing gear, which themselves are equipped with brakes.

The system according to the disclosed embodiments includes means for applying time-deferred braking between certain wheels of the landing gear at the start of an emergency braking maneuver, in order to reduce the amplitude of the aircraft's pitching motion.

In various different possible embodiments, the disclosed embodiments also relate to the characteristics that will become clear from the following description, which characteristics should be taken into consideration either separately or in all of their possible combinations:

In a single given set of landing gear, certain wheels (for example, the two wheels on a single axle) are braked with a certain delay in relation to the other wheels on the same set of landing gear;

In the case of an aircraft equipped with sets of main landing gear under the wing and also sets of main landing gear under the fuselage, the landing gear mounted under the wings are braked after the landing gear mounted under the fuselage, or vice versa;

More generally speaking, all of the wheels equipped with brakes are not braked simultaneously. There will be at least two groups of wheels, and possibly more. The wheels in the first group will be braked first, followed, after a given delay, by the wheels of the second group; and then, after a second delay, by the wheels in the third group, if one is present, etc. According to the two foregoing examples, a group may correspond to an axle or to a set of landing gear, but this specification is in no way limitative;

The deferred braking is based on any electronic, electrical, mechanical, or other means allows it to be implemented. For example, it may be based on a calculator that sends the braking order to the different wheels at different times. It may also be based on the hydraulic brake circuit, which, thanks to its design and its mechanical implementation, does not convey pressure to all of the brakes at the same time;

The delay or delays between the different groups of wheels may be predetermined, or else may be calculated in real time, by means of a delay calculator, in order to minimize the oscillations: for example, based on information provided by the aircraft's inertial guidance center.

The disclosed embodiments will be better understood through a reading of the following description and through reference to the accompanying figures, which are provided solely for illustrative purposes and which in no way limit the disclosed embodiments.

BRIEF DESCRIPTION OF THE DRAWINGS

FIG. 1 is a schematic perspective view of an aircraft equipped with four sets of main landing gear, two of which are located under the fuselage and two of which are located under the wings, with a set of forward landing gear located under the nose of the aircraft, with the line representing the pitch axis of the aircraft;

FIG. 2 is a schematic profile view of the aircraft performing an upward-and-downward pitching motion around a pitch axis, thereby causing compression and release of the shock absorber of the forward landing gear;

FIG. 3 represents two curves showing the vertical load applied to the forward landing gear of the aircraft as a function of time, with the first [6] curve being obtained in the absence of a braking delay between the wheels and with the second curve [7] being obtained in the presence of delayed braking of the wheels of the landing gear under the wings in relation to the [braking of the] wheels of the landing gear under the fuselage, supplemented by a table of values indicating the maximum load that can be read on each of the corresponding curves; FIG. 4 is a schematic representation of an example of an embodiment of a braking system that allows the application of deferred braking.

As noted hereinabove, the disclosed embodiments relate to a system that makes it possible to achieve a significant limitation in the amplitude of an aircraft's pitch oscillations during braking, and to reduce the resulting loads. The system includes means for applying time-deferred braking between certain wheels of the landing gear.

DETAILED DESCRIPTION OF THE DRAWINGS

Figure 1:
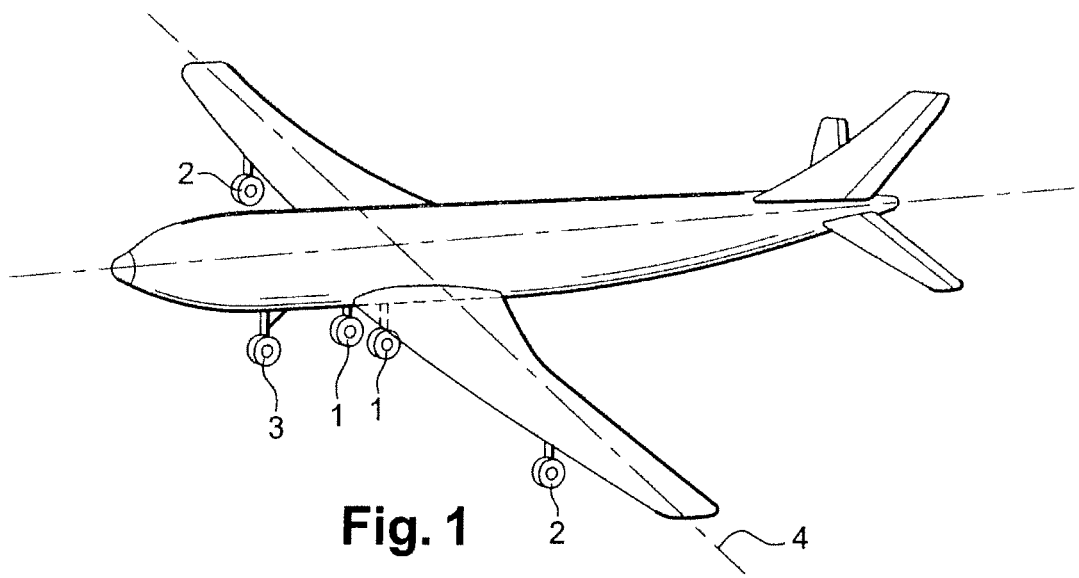
FIG. 1.

FIG. 1 is a schematic perspective view of such an aircraft, equipped, for example, with four sets of main landing gear, two of which [1] are located under the fuselage and two of which [2] are located under the wings, as well as a set of forward landing gear [3] located under the nose of the aircraft. The line [4] represents the aircraft's pitch axis.

Figure 2:
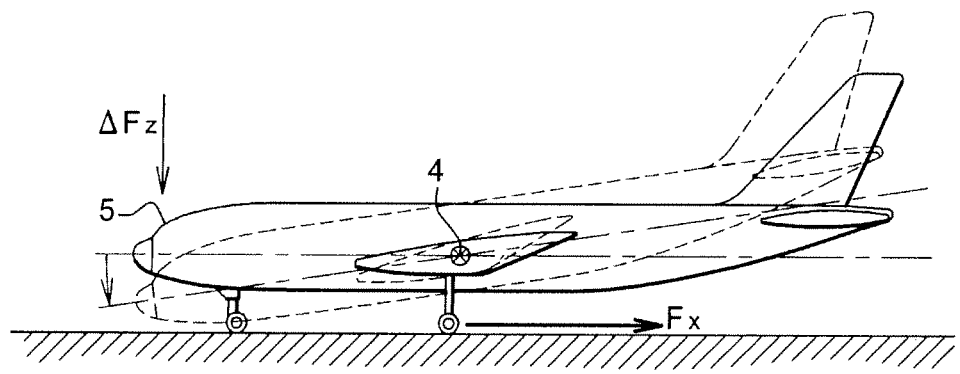
FIG. 2.
Figure 2:
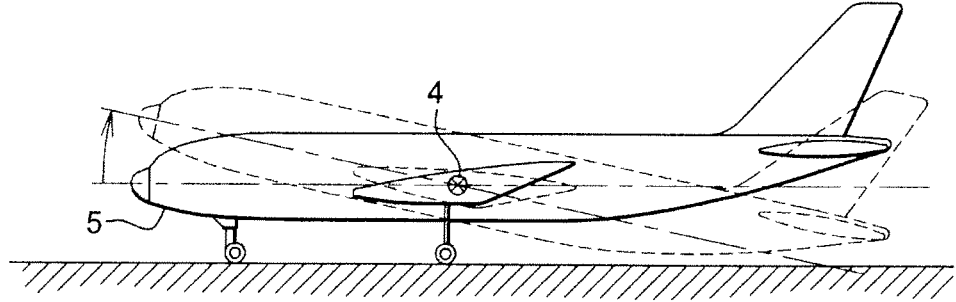

According to the prior art, during an emergency braking maneuver on the ground, all of the brakes of the wheels of the main landing gear are braked simultaneously. This braking effort, which is designated in FIG. 2 as [Fx], induces a diving moment [My] and causes the aircraft to execute a diving movement around its pitch axis [4]. This diving movement causes compression of the forward landing gear, whose vertical load is simultaneously increased. If the braking were performed slowly and gradually, the load on the forward landing gear would increase regularly, so as to balance (thanks to its nose-up effect) the diving moment caused by the braking. However, in an emergency braking maneuver, the suddenness of the aircraft's diving movement, along with the resulting impetus, cause the forward landing gear to compress even further, and to receive a greater load than would be necessary to balance the diving movement caused by the braking. Because the value required for pitch-balancing purposes has been exceeded, the compression of the forward landing gear reaches a maximum; thereafter, due to a rebound effect, the landing gear is released; then, as a result of the effect of the braking that continues to be applied, this release is halted and another compression phase is initiated. Consequently, the load on the forward landing gear undergoes pseudo-periodic oscillations that are more or less damped around a mean value, such that the aircraft is ultimately balanced in pitch.

Figure 3:
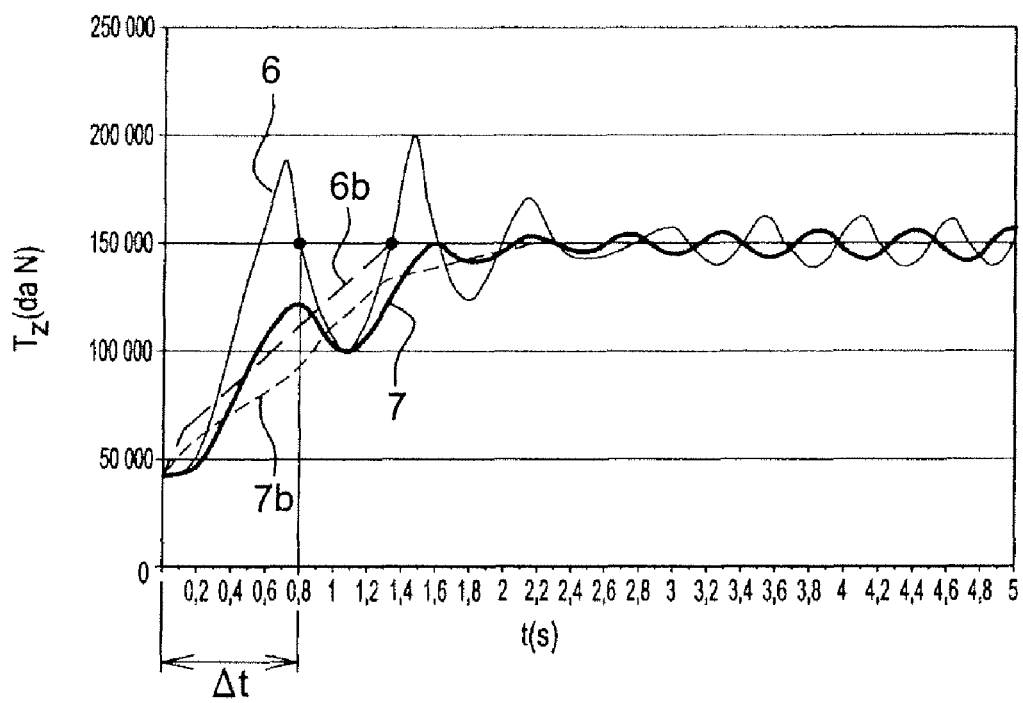
FIG. 3.

For example, a curve simulating the vertical load [Tz] applied to the forward landing gear of an aircraft such as an [Airbus] A340-600 or A380 is shown in curve [6] in FIG. 3, which clearly illustrates these pseudo-periodic oscillations that are damped around a mean value [6b], which is the value that would be required in order to balance the aircraft in pitch at each given instant. As can be seen, although the oscillations are damped, the second peak is the higher one, because of the mean value, which continues to increase.

The disclosed embodiments propose means that make it possible to interfere with the oscillations and thereby to reduce them. These means include time-deferred braking between the different wheels of the aircraft's landing gear.

In one particular embodiment, offered as a non-limitative example of the disclosed embodiments, the deferred braking consists of braking the wheels of the landing gear under the wings after the [braking of the] wheels of the landing gear under the fuselage. In this particular case, the act of first braking only one group of wheels reduces the violence of the diving motion, thereby also reducing the value of the first load peak applied to the forward landing gear. Ideally, the other wheels are then braked slightly after the forward landing gear has damped its release, so as to counter this release and neutralize, as much as possible, the oscillatory phenomenon. When this occurs, the second load peak on the forward landing gear is also limited. Thus, in this particular embodiment, the optimal delay between the two groups of braked wheels is on the same order of magnitude as the pseudo-period of the oscillations. This embodiment, which is only one particular and simple embodiment, has been found to be highly effective in reducing the amplitude of the oscillations and the load peak on the forward landing gear, as indicated in FIG. 3.

The curve [6] represents, for an aircraft such as an [Airbus] A340-600 or A380, the vertical load [Tz] on the forward landing gear that is obtained in the absence of deferred braking, while the curve [7] represents this same vertical effort as obtained by applying braking to the landing gear located under the wings, which braking is deferred by 0.8 second (in relation to the [braking of the] landing gear located under the fuselage, which is braked first). The curves [6b] and [7b] represent the equilibrium values around which the force on the forward landing gear oscillates. The maximum load all the forward landing gear reaches 201,000 daN in the absence of deferred braking, and only 155,000 daN with deferred braking, for a 22% reduction. A reduction on the same order of magnitude is obtained for the loads on the fuselage, in terms of the sharp load and the flexing moment.

Figure 4:
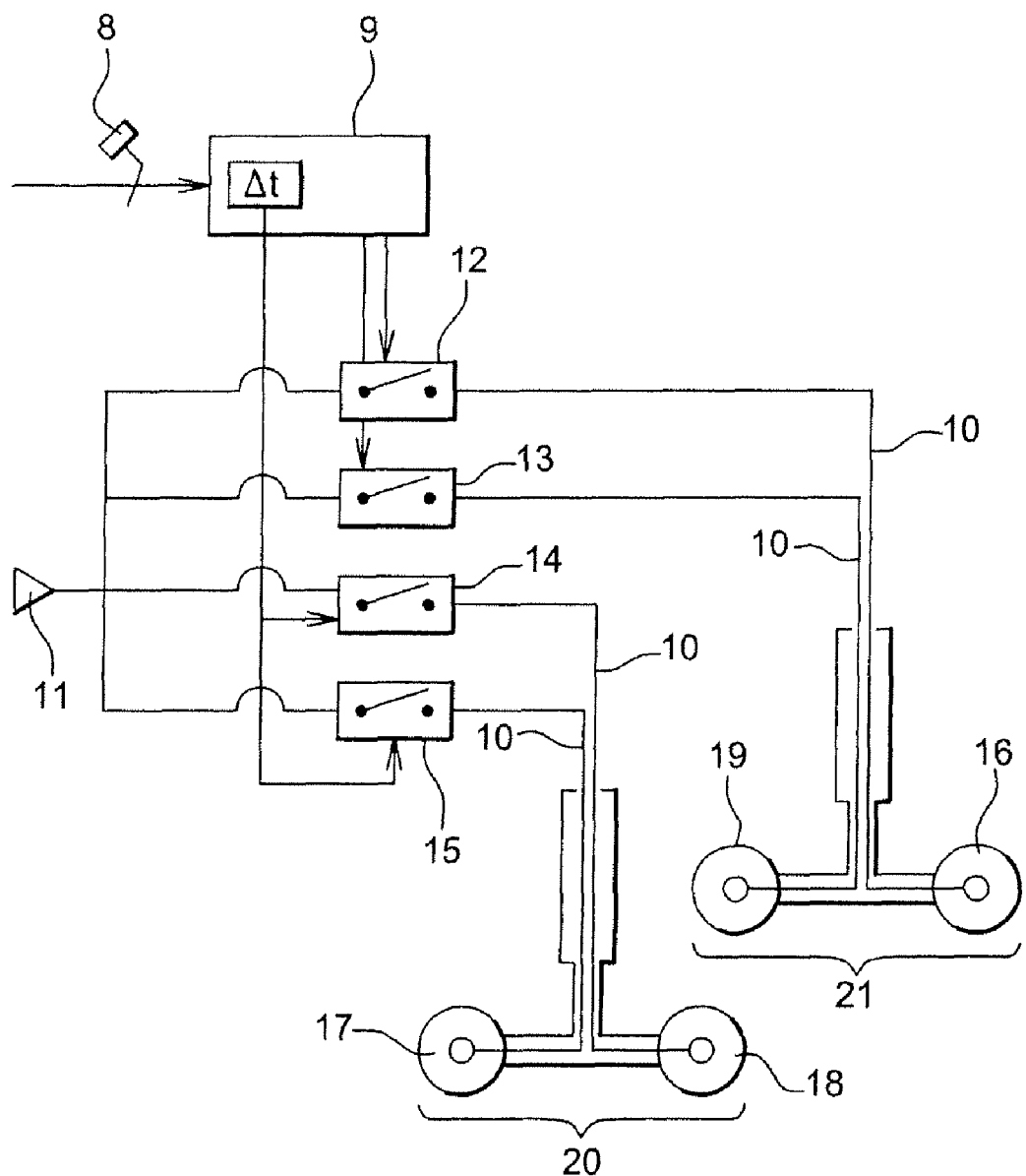
FIG. 4.

FIG. 4 is a schematic representation of an example of the structure of an aircraft braking circuit. This example serves as the basis of the following description of one embodiment of the deferred braking procedure. The braking instruction, which are generated by brake controls [8] that are located in the aircraft's cockpit, are not sent directly to the brakes, but pass first through a braking calculator [9].

A brake-delay calculator is advantageously incorporated directly into the braking calculator [9]. This delay calculator makes it possible to introduce, in real time, an optimized brake delay time [Δt] between certain wheels of the landing gear. This delay time [Δt] is between 0.5 second and 1.1 seconds, with the optimal delay time consisting of 0.8 second.

Apart from the disclosed embodiments, this calculator usually incorporates anti-skid functions for the wheels and functions for limiting the braking-torque rise rate. It may also be used within the context of the disclosed embodiments to introduce a braking delay between the wheels.

In the event of emergency braking (that is, in the event of a sudden actuation of the brake controls [8]), the calculator first sends an order to the solenoid valves [12 and 13], instructing them to open, which has the effect of conveying the pressure from the hydraulic circuit [11] to the hydraulic [brake] lines [10] that are connected to the brakes [16 and 19] of the landing gear [21]. Thus, the landing gear [21] is braked, while the landing gear [20] is not yet braked. After a delay [Δt], the calculator sends the order to the solenoid valves [14 and 15], instructing them to open, which has the effect of conveying the pressure from the hydraulic circuit [11] to the hydraulic [brake] lines [10] that are connected to the brakes [17 and 18] of the landing gear [20]. Thus, the landing gear [20] is braked with a delay [Δt] in comparison with the landing gear [21]. The mode of operation described in the present paragraph is only one example of an embodiment of deferred braking, and should not be viewed as limiting the disclosed embodiments.

The invention claimed is:

1. An aircraft pitch-oscillation limitation system, applied to an aircraft having wing main landing gears located under a wing of the aircraft, having at least one fuselage main landing gear located under a fuselage of the aircraft and having a forward landing gear located under a nose of the aircraft, wherein the aircraft pitch-oscillation limitation system includes means for automatically applying, in the event of a sudden braking, a time-deferred braking, the delay time of which is comprised between 0.5 second and 1.1 seconds, between wheels of the wing main landing gears and wheels of the at least one fuselage main landing gear, to reduce an amplitude of an oscillation in pitch of the aircraft when the sudden braking occurs.

2. An aircraft pitch-oscillation limitation system according to claim 1 wherein the means for applying the time-deferred braking includes a brake-delay calculator that calculates the delay time to be applied using data issued by an inertial reference system.

3. An aircraft pitch-oscillation limitation system according to claim 1, wherein the time-deferred braking consists of braking the wheels of the wing main landing gears after the wheels of the at least one fuselage main landing gear.

4. An aircraft pitch-oscillation limitation system according to claim 3 wherein the delay time is 0.8 second.

5. An aircraft pitch-oscillation limitation system according to claim 1, wherein the the time-deferred braking consists of braking the wheels of the wing main landing gears before the wheels of the at least one fuselage main landing gear.

6. An aircraft pitch-oscillation limitation system according to claim 5, wherein the delay time is 0.8 second.

7. An aircraft including a system for the limitation of pitch oscillation during braking, according to claim 1.

8. An aircraft according to claim 7, wherein the aircraft includes brake controls that are located in the cockpit and that are connected to a brake system that includes a braking calculator and hydraulic brake lines equipped with solenoid valves controlled by the calculator.

9. An aircraft according to claim 8, wherein a brake-delay calculator is incorporated into the braking calculator.

* * * * *